United States Patent [19]

Duprez

[11] 3,950,830

[45] Apr. 20, 1976

[54] QUICK ATTACHMENT AND RELEASE WORM GEAR TYPE HOSE CLAMP

[75] Inventor: Wayne R. Duprez, West Newton, Mass.

[73] Assignee: Standard-Thomson Corporation, Waltham, Mass.

[22] Filed: Sept. 3, 1974

[21] Appl. No.: 502,816

[52] U.S. Cl. ............................................. 24/274 R
[51] Int. Cl. .............................................. B65d 63/00
[58] Field of Search ..................... 24/274 R, 274 P; 72/379

[56] References Cited
UNITED STATES PATENTS

| | | | |
|---|---|---|---|
| 2,607,092 | 8/1952 | Rubly | 24/274 R |
| 2,767,455 | 10/1956 | Schaefer | 24/274 P |
| 2,944,314 | 7/1960 | Black | 24/274 R |
| 3,028,650 | 4/1962 | Tinsley | 24/274 R |
| 3,116,529 | 1/1964 | Henning | 24/274 P |
| 3,371,392 | 3/1968 | Rueckheim | 24/274 R |

Primary Examiner—Donald A. Griffin
Attorney, Agent, or Firm—Jacox & Meckstroth

[57] ABSTRACT

A worm gear type hose clamp having quick attachment and release features. A housing carries a worm or screw member which is meshable with a toothed or slotted portion of a band. The band has a ramp portion which is, preferably, an integral part thereof. The housing is movable along the ramp portion of the band, from a part of lesser extension to a portion of greater extension, to urge the worm into meshed engagement with the toothed portion of the band. In such position of the housing, the band is tightened or loosened by rotative movement of the worm. The housing also is movable along the ramp portion from the part of greater extension to the part of lesser extension to release the worm from meshed engagement with the toothed portion of the band and to permit free movement of the toothed portion of the band without rotative movement of the worm. The band has portions which limit movement of the housing with respect thereto.

32 Claims, 19 Drawing Figures

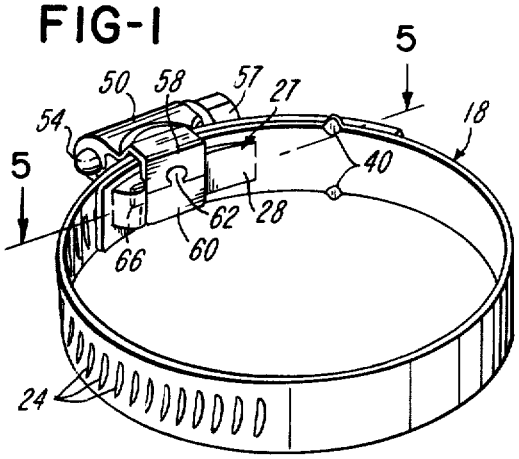
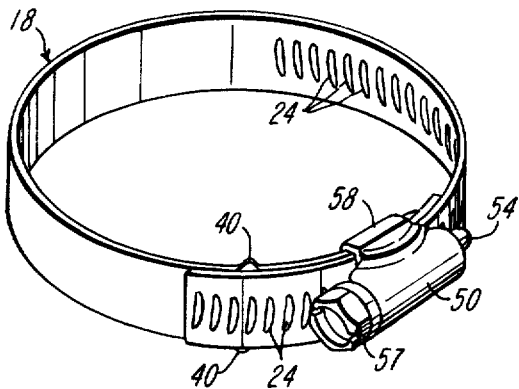
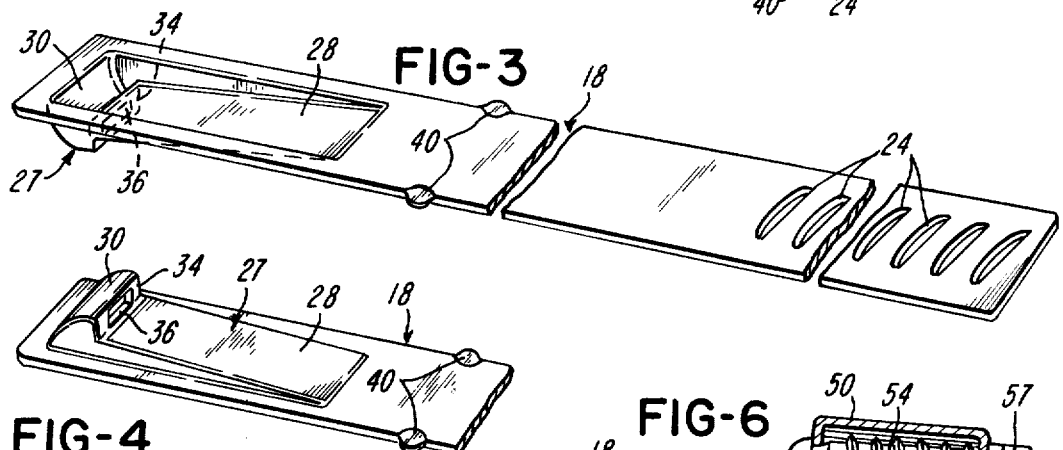
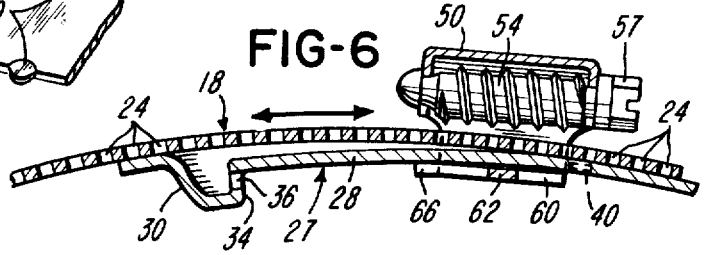
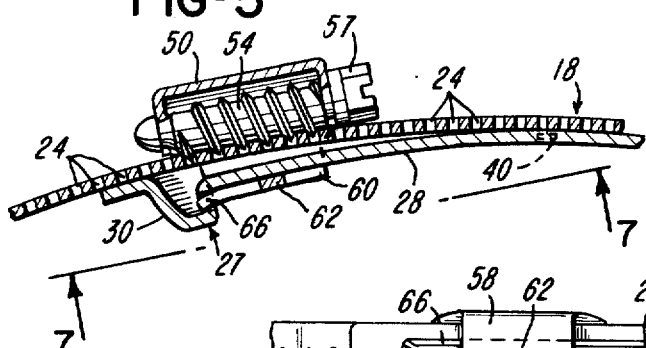
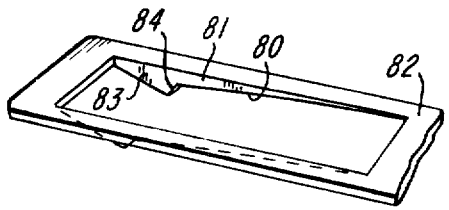
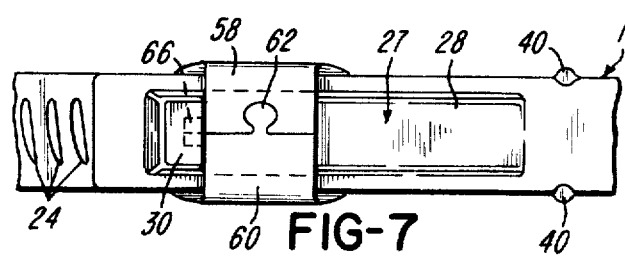

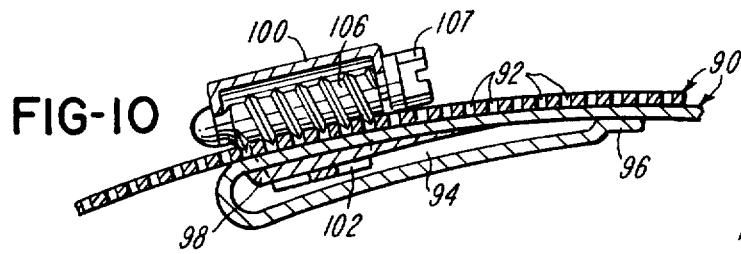
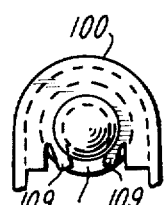
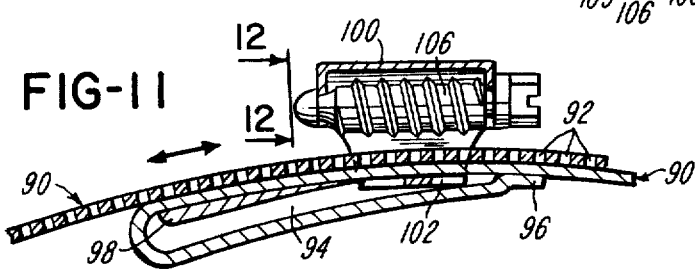
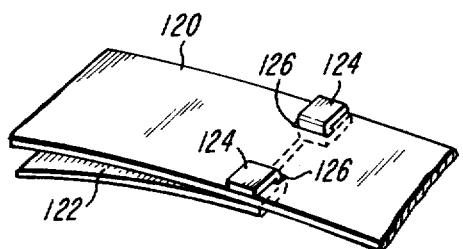
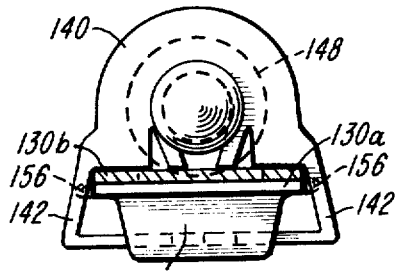
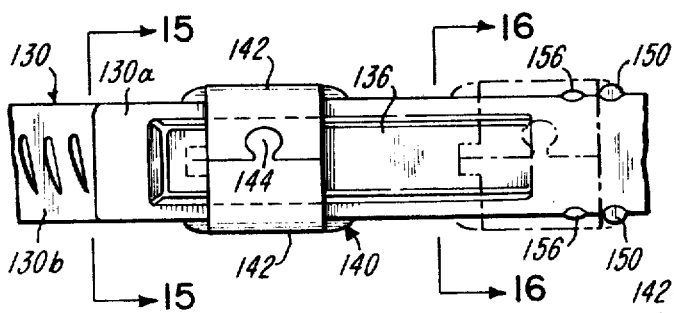
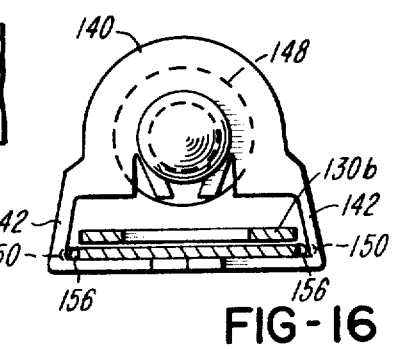

3,950,830

QUICK ATTACHMENT AND RELEASE WORM GEAR TYPE HOSE CLAMP

BACKGROUND OF THE INVENTION

Numerous quick attachment and release worm gear types of hose clamps have been created. However, so far as is known, all such hose clamps of the worm gear type have structure in which the worm is movable with respect to the housing thereof, for release of the worm from threaded engagement with the band. Such devices are structurally weak and short-lived. Furthermore, known quick release worm gear type hose clamps are relatively expensive to produce.

An object of this invention is to provide a quick attachment and release worm gear type hose clamp in which the worm and the housing thereof are movable as a unit with respect to the band for quick change of the diameter of the band.

Another object of this invention is to provide such a hose clamp which can be constructed at relatively low costs and which is long-lived.

Other objects and advantages of this invention reside in the construction of parts, the combination thereof, the method of manufacture, and the mode of operation, as will become more apparent from the following description.

BRIEF DESCRIPTION OF THE VIEWS OF THE DRAWING

FIG. 1 is a perspective view of a hose clamp of this invention.

FIG. 2 is another perspective view of the hose clamp of FIG. 1, the view being taken at substantially 180° from the position of FIG. 1.

FIG. 3 is an enlarged fragmentary perspective view of a portion of the band of a hose clamp of this invention.

FIG. 4 is another fragmentary perspective view, showing a part of the portion of the band shown in FIG. 3, the view being taken substantially on the same scale as FIG. 3 and at an angle of substantially 180° from the position of FIG. 3.

FIG. 5 is an enlarged sectional view taken substantially on line 5—5 of FIG. 1.

FIG. 6 is an enlarged sectional view, similar to FIG. 5, but illustrating the release position of the worm from the band.

FIG. 7 is a bottom view taken substantially on line 7—7 of FIG. 5.

FIG. 8 is a perspective view of a housing member of the hose clamp of FIGS. 1–7, drawn on substantially the same scale as FIGS. 1 and 2.

FIG. 9 is a perspective view, drawn on substantially the same scale as FIGS. 3 and 4, showing a modification in the band of a hose clamp of this invention.

FIG. 10 is a sectional view illustrating another embodiment of the hose clamp of this invention.

FIG. 11 is a sectional view, similar to FIG. 10, showing the hose clamp thereof in a release position of the worm from the band.

FIG. 12 is an elevational view taken substantially on line 12—12 of FIG. 11.

FIG. 13 is a fragmentary perspective view showing a modification in the attachment of a looped portion of a band of a hose clamp of this invention.

FIG. 14 is a fragmentary bottom view of a housing portion and a part of the band portion of a modification in a hose clamp of this invention.

FIG. 15 is a sectional view taken substantially on line 15—15 of FIG. 14.

FIG. 16 is a sectional view taken substantially on line 16—16 of FIG. 14.

DETAILED DESCRIPTION OF THE PREFERRED EMBODIMENTS

Figure 17:
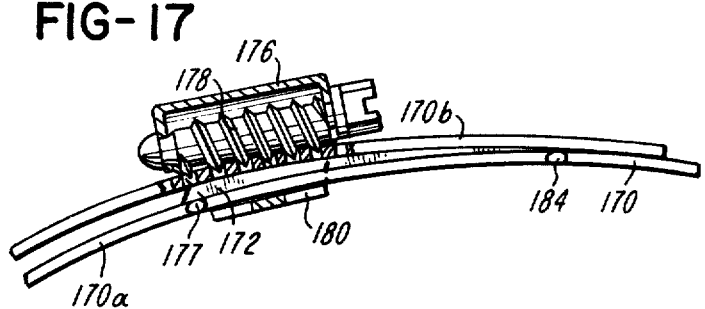
FIG. 17 is a side sectional view showing a modification in a hose clamp of this invention, showing the housing in clamping position.

A hose clamp of this invention, as shown in FIGS. 1–8, comprises a band 18 in the form of an elongate strip of any suitable material, for example, a metallic or plastics material or the like. The band 18 has a series of substantially parallel slots or teeth 24 adjacent one end thereof and extending along a portion of the length thereof. The opposite end of the band 18 for a short portion of the length thereof has a protuberance 27, as best illustrated in FIGS. 3 and 4. The protuberance 27 is formed in any suitable manner, for example, by forcing or extruding a portion of the band outwardly by stretching that portion of the band. The protuberance 27 has a ramp portion 28 which extends angularly from the main portion of the band and an abutment portion 30, which is joined to the ramp portion 28 by an engagement wall 34, which has an opening 36 therein. The engagement wall 34 is substantially at right angles with respect to the ramp portion 28.

Adjacent the protuberance 27, the band 18 is provided with lugs 40, pressed therefrom and extending laterally therefrom.

A housing 50 has a threaded worm 54 rotatatively mounted therein. The worm 54 has a head 57 for rotation thereof. The housing 50 has integral leg portions or legs 58 and 60 which encompass the portion of the band 18 at which the ramp portion 28 is located. The leg 60 has a tab 62 which fits into a correspondingly shaped notch in the leg 58 to attach the housing 50 to the band 18. Each of the legs 58 and 60 of the housing 50 has a stem 66 which extends therefrom substantially parallel with the axis of rotation of the worm 54.

OPERATION

The housing 50 is slidable along the band 18 as the legs 58 and 60 of the housing 50 encompass the ramp portion 28. The portion of the band 18 which has the teeth or slots 24 is adapted to extend through the housing 50. The housing 50 is movable to a position in which the legs 58 and 60 thereof engage the engagement wall 34. In this position the stems 66 extend into the opening 36 in the engagement wall 34, as shown in FIG. 5. The stems 66 thus prevent the housing 50 from further movement by preventing the legs 58 and 60 from movement over the abutment portion 30. In this position of the housing 50, as illustrated in FIG. 5, the worm 54 is urged toward the portion of the band 18 which extends through the housing 50. The threads of the worm 54 are in mesh with the teeth or slots 24 of the band 18 as that portion of the band 18 extends through the housing 50. Thus, as the worm 54 is rotated by rotation of the head 57, the portion of the band 18 which extends through the housing 50 is moved with respect to the housing 50. Thus, the diameter of the band 18 becomes greater or smaller with rotative movement of the worm 54 when the housing is positioned as shown in FIGS. 1, 2, and 5.

The housing 50 is also movable along the band 18 to the right, as illustrated in FIG. 6, to a position in which the housing 50 engages the lugs 40. When the housing 50 is moved from the position thereof shown in FIG. 5 to the position thereof shown in FIG. 6, the legs 58 and 60 of the housing 50 move along the ramp portion 28 from a position in which the ramp portion 28 closely retains the housing 50 and in which the worm 54 is forced toward the band 18, to a position in which the housing 50 is loose upon the band 18. In this position of the housing 50 illustrated in FIG. 6, the portion of the band 18 which extends through the housing 50 is movable with respect to the housing 50 without engagement with the worm 54.

Thus, in the position of the housing 50 shown in FIG. 6, the band can be easily and readily made larger or smaller in diameter without rotative movement of the worm 54. Thus, it is understood that the housing 50 is readily movable from the position illustrated in FIG. 5 to the position shown in FIG. 6 when it is desired to quickly attach the hose clamp of this invention to a hose or to detach the clamp from a hose.

FIG. 9

FIG. 9 shows a modification in the ramp and abutment portions of a band of a hose clamp of this invention. A band 82 has a pair of angular sections 81 which are cut along one edge thereof and bent at right angles with respect to the band 82. Each angular section 81 has an edge surface which forms a ramp 80 and a part 83 which forms an abutment shoulder 84 adjacent the ramp 80. Thus, a pair of spaced-apart ramps 80 and abutment shoulders 84 are formed. A housing, not shown, such as the housing 50 having legs 58 and 60, is adapted to encompass the band 82 and the ramps 80. The housing is movable to a position to engage the abutment shoulders 84. In such position the worm 54 of the housing 50 engages the opposite end portion of the band 82 which extends through the housing 50, for clamping of the band 82. The housing 50 is also movable along the ramps 80 to a position spaced from the abutment shoulders 84, and in such position the worm 54 can be free from engagement with a portion of the band 82 which extends through the housing 50 for release of the band 82.

FIGS. 10, 11 AND 12

FIGS. 10, 11 and 12 illustrate a modification in the band of a hose clamp of this invention. A band 90 has one end portion provided with a series of teeth or slots 92. The other end portion of the band 90 is provided with a loop 94, as the band 90 is attached to itself at a point 96. Any suitable means of attachment may be employed, such as welding, soldering, screws, tabs, or the like.

Within the loop 94, a ramp 98 is attached to the band 90 or is an integral part thereof. A housing 100 which may be similar to the housing 50, shown in FIGS. 1, 2, 5, 6, and 8, has leg portions 102, which may be similar to the leg portions 58 and 60 of the housing 50. The leg portions 102 extend through the loop 94 and encompass the ramp 98. The housing 100 rotatably supports a threaded worm 106, having a head 107.

As shown in FIG. 12, the end of the worm 106 opposite the head 107 is rotatively carried by tabs 109, which are partially severed from the housing 100 and bent slightly one toward the other to form a cradle within which that end of the worm 106 is rotatively supported.

When the leg portions 102 of the housing 100 encompass the portion of the ramp 98 having the greatest thickness, as shown in FIG. 10, the housing 100 is urged toward the ramp 98, and the portion of the band 90 which extends through the housing 100 is engaged by the threaded portion of the worm 106. Thus, rotation of the worm 106 causes movement of the portion of the band 90 which extends through the housing 100, to cause the diameter of the band 90 to become greater or smaller.

When the housing 100 is moved to the position shown in FIG. 11, the leg portions 102 of the housing 100 do not encompass the part of the ramp 98 which has the greatest thickness. In this position the threaded portion of the worm 106 is not urged into engagement with the portion of the band 90 which extends through the housing 100. Thus, the portion of the band 90 which extends through the housing 100 is freely movable with respect to the housing 100, without rotative movement of the worm 106.

The loop 94, within which the leg portions 102 of the housing 100 are disposed, prevents movement of the housing 100 from the band 90.

FIG. 13

FIG. 13 shows a modification in the house clamp of FIGS. 10, 11 and 12. A band 120 has a loop portion 122 which is similar to the loop 94 shown in FIGS. 10 and 11. The end part of the loop 122 is attached to the band 120 by lugs 124 which extend through openings 126 and are bent angularly against the band 120. Thus, the end of the loop 122 is attached to the band 120 without welding, soldering, or the like.

FIGS. 14, 15 AND 16

FIGS. 14, 15 and 16 illustrate another embodiment in the hose clamp of this invention. A band 130 has an end portion 130a which is provided with a ramp 136, which, preferably, may be similar to the ramp 28 shown in FIGS. 1, 3 and 4.

A housing 140 has legs 142 which encompass the portion 130a and the ramp 136. The legs 142 are angularly inclined, one form the other as the legs 142 encompass the portion 130a and as one leg 142 terminates in a tab 144 which fits into a complementary recess in the other leg 142.

The housing 140 is movable along the portion 130a of the band 130 and along the ramp 136. In the position of the housing 140 shown in solid lines in FIG. 14, the ramp 136 forces the housing 140 toward a toothed portion 130b of the band 130, which extends through the housing 140, and a worm 148 within the housing 140 is in engagement with the toothed portion 130b of the band 130, as shown in FIG. 15.

The housing 140 is also movable along the portion 130a of the band 130 and along the ramp 136 to the position illustrated by broken lines in FIG. 14. In such position, the housing 140 abuttingly engages stop lugs 150, which are a part of the band 130 and which limit movement of the housing 140 along the band 130. When the housing 140 moves along the band 130 to the position thereof shown in broken lines in FIG. 14, the legs 142 which have portions which are farther apart at the lower portions thereof receive positioning lugs 156 which are adjacent the stop lugs 150. Thus, the housing 140 is retained in a position in which there is maximum space between the end of the legs 142 and the worm 148. Thus, the toothed portion 130b of the band 130 is freely movable without engagement with the worm 148, as illustrated in FIG. 16. Thus, the hose clamp is quickly releasable from a hose or quickly attached thereto without manually urging the upper part of the housing and the worm 148 away from the leg portions 142.

FIGS. 17 – 19

Figure 18:
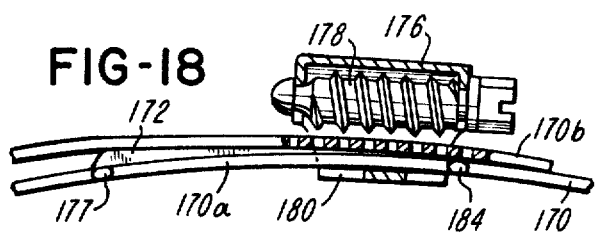
FIG. 18 is a side sectional view of the hose clamp of FIG. 17 showing the housing in release position.
Figure 19:
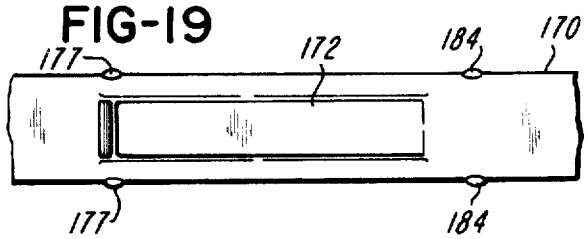
FIG. 19 is a fragmentary top plan view of the ramp portion of the hose clamp of FIGS. 17 and 18.

FIGS. 17-19 illustrate another embodiment of a hose clamp of this invention. A band 170 has an inclined ramp 172 on the upper surface of a portion 170a thereof. A housing 176 rotatably carries a worm or screw 178. The housing 176 has leg portions 180 which encompass the portion 170a. A toothed portion 170b of the band 170 extends through the housing 176 and is located upon the ramp 172. The housing 176 is movable along the ramp 172 to the portion thereof having the greatest dimension, as illustrated in FIG. 17. In this position, the worm 178 is forced against the toothed portion 170b for clamping of the hose clamp. In this position the housing 176 engages stop lugs 177 to limit the movement thereof. When the housing 176 is moved along the ramp 172 to the position shown in FIG. 18 in which the housing is adjacent the minimum dimension portion of the ramp 172, the portion 170b of the band 170 can move with respect to the housing 176 without rotation of the worm 178. In this position the housing 176 engages stop lugs 184 for limiting the movement thereof.

Although the preferred embodiment of the device has been described, it will be understood that within the purview of this invention various changes may be made in the form, details, proportion and arrangement of parts, the combination thereof, and the mode of operation, which generally stated consist in a device capable of carrying out the objects set forth, as disclosed and defined in the appended claims.

The invention having thus been described, the following is claimed:

1. A hose clamp comprising:
an elongate band having a portion provided with an inclined ramp, the ramp having a portion of greater extension and a portion of lesser extension with a portion of increasing extension therebetween, another portion of the band having a series of teeth,
a housing including retainer means at least partially encompassing the band to retain the housing upon the band, the retainer means partially encompassing the ramp, the portion of the band which has the series of teeth being positionable within the housing, the housing having a carrier portion,
a threaded member rotatably carried by the carrier portion of the housing,
the housing being movable along the ramp to the portion of greater extension so that the retainer means in engagement with the ramp urges the carrier portion of the housing toward the portion of the band which has the series of teeth, forcing the threaded member into meshed relation with the teeth so that rotative movement of the threaded member causes linear movement of the portion of the band which is within the housing, the housing being movable along the ramp to the portion of lesser extension, permitting the carrier portion of the housing to be spaced from the portion of the band which has the series of teeth, so that the portion of the band which is within the housing is linearly movable with respect to the housing without rotative movement of the threaded member.

2. The hose clamp of claim 1 in which the portion of the band which is provided with the ramp is also provided with abutment means adjacent each end of the ramp and limiting movement of the housing with respect to the band.

3. The hose clamp of claim 2 in which the abutment means is provided with an opening and the retainer means is provided with a stem movable into the opening to prevent movement of the retainer means over the abutment means.

4. The hose clamp of claim 2 in which the ramp and the abutment means are combined as an integral protuberant portion of the band.

5. The hose clamp of claim 2 in which the abutment means is a partially pierced out portion of the band which extends angularly therefrom.

6. The hose clamp of claim 1 in which the ramp is an integral protuberant portion of the band.

7. The hose clamp of claim 1 in which the ramp is a partially pierced out portion of the band which extends angularly therefrom.

8. The hose clamp of claim 1 in which the band has a main surface portion and the ramp is a displaced part of the main surface portion extending angularly therefrom.

9. The hose clamp of claim 1 in which the band has a loop, the ramp being within the loop, a part of the retainer means being within the loop.

10. A hose clamp comprising:
a band member, the band member being provided with a main surface having an inclined portion extending from the main surface, the inclined portion having a part farther from the main surface and a part closer to the main surface,
an engagement member,
support means including means for rotative support of the engagement member and means for attaching the engagement member to the band member adjacent the inclined part of the band member, the support means supporting the rotatable engagement member for movement of the engagement member along the inclined portion of the band member,
the band member having an engagement part movably positioned within the housing,
the support means being movable along the inclined portion of the band member to the part thereof which is farther from the main surface to position the rotatable engagement member in firm engagement with the engagement part of the band member, so that rotative movement of the engagement member causes movement of the engagement part of the band with respect to the support means,
the support means being movable along the inclined portion of the band member to the part thereof which is closer to the main surface to permit the engagement part of the band member to move with respect to the housing without engagement with the engagement member.

11. The hose clamp of claim 10 in which the band member has a loop portion, the support means having a part within the loop portion for limiting the movement of the support means with respect to the band member.

12. The hose clamp of claim 11 in which the inclined portion of the band member is within the loop portion thereof.

13. A hose clamp comprising:
- a band, the band having a protuberant inclined portion, the band also having an engagement portion,
- a support member carried by the band and movable along the inclined portion,
- an engagement member rotatably supported by the support member,
- the engagement portion of the band being movably positioned adjacent the support member,
- the support member being movable along the inclined portion of the band to move the engagement member into and out of engagement with the engagement portion of the band.

14. A hose clamp comprising:
- a band having an engagement portion, the band also having a loop portion,
- an inclined ramp within the loop portion,
- a housing having a part within the loop portion and movable along the inclined ramp,
- an engagement member supported by the housing for rotation with respect thereto,
- the band having an engagement portion within the housing,
- the housing being movable along the inclined ramp to change the position of the engagement member with respect to the engagement portion of the band within the housing, the engagement member thus being movable into and out of engagement with the engagement portion of the band, the loop portion of the band limiting the movement of the housing with respect to the band.

15. A hose clamp comprising:
- a band having an engagement portion, an inclined ramp carried, by the band,
- a housing having a part movable along the inclined ramp,
- an engagement member supported by the housing,
- the band having an engagement portion within the housing,
- the housing being movable along the inclined ramp to change the position of the engagement member with respect to the engagement portion of the band within the housing, thus moving the engagement member into and out of engagement with the engagement portion of the band.

16. The hose clamp of claim 15 in which the engagement member is a threaded worm rotatably carried by the housing.

17. The hose clamp of claim 16 in which the housing has a pair of tabs partially severed therefrom, the tabs extending one toward the other and rotatably supporting a part of the worm.

18. The hose clamp of claim 16 in which the housing encompasses the portion of the band which has the inclined ramp, the ramp being on the surface of the band which faces the worm, another part of the band extending through the housing and being positioned between the ramp and the worm.

19. The hose clamp of claim 16 in which the housing includes a pair of legs partially encompassing the band and the ramp, the legs being inclined one from the other, the band including positioning tabs which extend laterally from the side edges of the band and which are engaged by the legs to retain the position of the housing with respect to the band.

20. The method of producing a hose clamp provided with a band and a housing carried by the band, a threaded worm rotatably carried by the housing, the band having a main surface portion, the housing having a portion encompassing another portion of the band, comprising:
- forcing a part of said other portion of the band from the main surface portion to form a protuberance extending from the main surface portion at an angle with respect thereto, the protuberance thus serving as a ramp along which the housing is slidably movable, the protuberance extending from the main surface portion forming a plurality of angular parts, one of the angular parts being a ramp and another angular part being an abutment.

21. The method of producing a hose clamp provided with a band and a housing movably carried by a support part of the band, the band also having an engagement part, and in which a threaded worm is rotatably carried by the housing, said support part of the band having a main surface portion, the housing being movable with respect to said support part of the band to adjust the worm with respect to the engagement part of the band, comprising:
- providing a portion of said support portion of the band with an inclined ramp which extends from the main surface portion and at an angle with respect thereto, positioning a part of the housing adjacent the inclined ramp so that said part of the housing is slidable along the inclined ramp to longitudinally and laterally adjust the position of the housing with respect to the engagement part of the band and to move the threaded worm into and out of engagement with the engagement part of the band.

22. The method of claim 21 in which said support part of the band is provided with an inclined ramp by forcing a portion of the band from the main surface portion to form a protuberance extending from the main surface portion at an angle with respect thereto.

23. The method of claim 22 in which the protuberance is a continuous part of the main surface portion and includes an abutment at one end of the inclined ramp.

24. The method of claim 22 in which the protuberance is extruded from the main surface portion.

25. The method of claim 22 in which the protuberance is formed by severing a part from the main surface portion, followed by moving the part to a position at an angle with respect to the main surface portion.

26. The method of claim 21 in which the inclined ramp is formed from a separate element and is attached to the support part of the band.

27. The method of producing a hose clamp of the type provided with a band having a support portion and an engagement portion, the support portion of the band having a body region between a pair of side edges, a support member movably carried by the support portion and having parts at opposite portions of the body region thereof, the support member including a carrier part and a follower part, a threaded worm carried by the carrier part, the engagement portion of the band being positioned between the support portion of the band and the carrier part of the support member, comprising:
- forcing a part of the body region of the band outwardly therefrom between the side edges to form a protuberance having an engagement surface which is angular with respect to the side edges of the body region of the band, along which the follower part of the support member is movable with movement of the support member for lateral movement of the support member with longitudinal movement thereof, for movement of the threaded worm into and out of engagement with the engagement portion of the band.

28. The method of producing a hose clamp according to claim 27 which includes forming an abutment protuberance in the support portion of the band which is engageable by the follower part of the support member to limit longitudinal movement of the support member with respect to the support portion of the band.

29. A hose clamp comprising:
an elongate band provided having a loop portion and a tooth portion,
means forming an inclined ramp within the loop,
screw support means carried by the loop portion of the band, the screw support means having an engagement part within the loop portion of the band and a part exterior of the loop portion of the band,
a screw rotatably supported by the screw support means exterior of the loop portion of the band,
the loop portion of the band having an exterior surface engaged by the tooth portion of the band, the screw support means being movable along the loop portion of the band as the engagement part of the screw support means within the loop portion moves along the inclined ramp, such movement of the engagement part along the inclined ramp moving the screw toward and away from the tooth portion of the band for engaging and releasing the screw with respect to the tooth portion of the band.

30. The hose clamp of claim 29 in which the loop portion of the band has lugs at the end thereof which extend through the band to maintain the loop in closed condition.

31. A hose clamp comprising:
an elongate band provided with a tooth part and a support part, the support part of the band having an inclined ramp,
a support member carried by the support part of the band and movable therealong,
a threaded worm rotatably carried by the support member,
the tooth part of the band being positioned between the inclined ramp and the worm so that movement of the support member along the support part of the band moves the support member with respect to the inclined ramp and thus moves the worm toward and away from the tooth part for engaging and disengaging the worm with respect to the tooth part of the band.

32. A hose clamp comprising:
an elongate band provided with a tooth portion and a support portion, the support portion having an inclined ramp,
a support member carried by the support portion and movable therealong and having a follower part movable along the inclined ramp,
a worm carried by the support member,
the tooth portion of the elongate band being positioned between the support portion of the band and the worm,
movement of the support member along the support portion of the band and movement of the follower part of the support member along the inclined ramp moving the worm toward and away from the tooth portion of the band for engaging and disengaging the worm with respect to the tooth portion of the band.

* * * * *